United States Patent [19]
Yamazaki et al.

[11] Patent Number: 5,341,053
[45] Date of Patent: Aug. 23, 1994

[54] LINEAR MOTOR WITH PERMANENT MAGNETS

[75] Inventors: Koichi Yamazaki, Sakado; Kazuo Noda, Yokohama; Eiichi Nakamura, Sagamihara, all of Japan

[73] Assignee: Nippon Conlux Co., Ltd., Tokyo, Japan

[21] Appl. No.: 682,691

[22] Filed: Apr. 9, 1991

[30] Foreign Application Priority Data

| Apr. 9, 1990 | [JP] | Japan | 2-93505 |
| Apr. 9, 1990 | [JP] | Japan | 2-93506 |
| Apr. 12, 1990 | [JP] | Japan | 2-97216 |

[51] Int. Cl.⁵ .................. H02K 41/02; H02K 33/18; H01F 7/08
[52] U.S. Cl. .................. 310/13; 310/27; 310/154; 318/135; 335/220
[58] Field of Search .......... 310/12, 13, 15, 17, 310/27, 28, 36, 154, 156; 318/135; 335/220

[56] References Cited

U.S. PATENT DOCUMENTS

| 3,149,254 | 9/1964 | Carter et al. | 310/12 |
| 4,110,718 | 8/1978 | Odor et al. | 335/296 |
| 4,237,397 | 12/1980 | Mohr et al. | 310/154 |
| 4,383,193 | 5/1983 | Tomite et al. | 310/154 |
| 4,414,594 | 11/1983 | Farmer et al. | 360/106 |
| 4,438,362 | 3/1984 | Brown | 310/152 |
| 4,692,999 | 9/1987 | Frandsen | 29/596 |
| 4,760,480 | 7/1988 | Takekado | 360/106 |
| 4,792,707 | 12/1988 | Katanuma | 310/12 |
| 4,853,808 | 8/1989 | Lutz | 360/98.01 |
| 4,864,170 | 9/1989 | Eguchi | 310/12 |
| 4,888,506 | 12/1989 | Umehara et al. | 310/13 |
| 4,945,330 | 7/1990 | Aritz | 335/229 |
| 5,023,496 | 6/1991 | Niikura | 310/12 |
| 5,121,016 | 6/1992 | Wachi | 310/14 |

FOREIGN PATENT DOCUMENTS

| 0091112 | 10/1983 | European Pat. Off. |
| 0326374 | 8/1989 | European Pat. Off. |
| 56-145770 | 11/1981 | Japan |
| 57-110069 | 7/1982 | Japan |
| 59-223887 | 12/1984 | Japan |
| 62-114459 | 5/1987 | Japan |
| 62-173968 | 7/1987 | Japan |
| 62-229531 | 10/1987 | Japan |
| 2018751 | 1/1990 | Japan |
| 2023058 | 1/1990 | Japan |
| 265647 | 8/1990 | Japan |

Primary Examiner—Steven L. Stephan
Assistant Examiner—D. R. Haszko
Attorney, Agent, or Firm—Spensley Horn Jubas & Lubitz

[57] ABSTRACT

A linear motor having a magnetic circuit and a moving coil, the magnetic circuit comprising a linear yoke provided at the center of the circuit and a pair of linear magnets, the linear yoke and the pair of linear magnets forming a pair of linear gaps with the linear yoke interposed therebetween, the magnetic circuit applying a magnetic field to the linear gaps, the movable coil mounted on the linear yoke of the magnetic circuit being moved along the linear yoke by an electromagnetic action to the magnetic circuit when the movable coil is powered, wherein the linear magnet has a larger magnetic force at opposite end portions in the longitudinal direction of the linear magnet than at an intermediate area, the magnetic reluctance of the magnetic circuit is made large to obtain a driving current of the movable coil corresponding to the magnetic reluctance when the moving coil moves at the intermediate area of the linear magnet, or the magnetic circuit is mounted on a plate made of material having the same magnetic reluctance as the linear yoke. An information recording/reproducing apparatus having a card transport stage for transporting an information recording medium and a laser unit for radiating a laser beam to the information recording medium, the information recording/reproducing apparatus writing and reading information to and from the information recording medium while reciprocally moving the card transport stage and linearly and reciprocally moving the information recording medium and applying a laser beam to the information recording medium, wherein the apparatus comprising a transport unit wherein the plane of driving force by driving means for reciprocally moving the card transport stage is made substantially flush with the center of a guide shaft for sliding the transport stage.

8 Claims, 17 Drawing Sheets

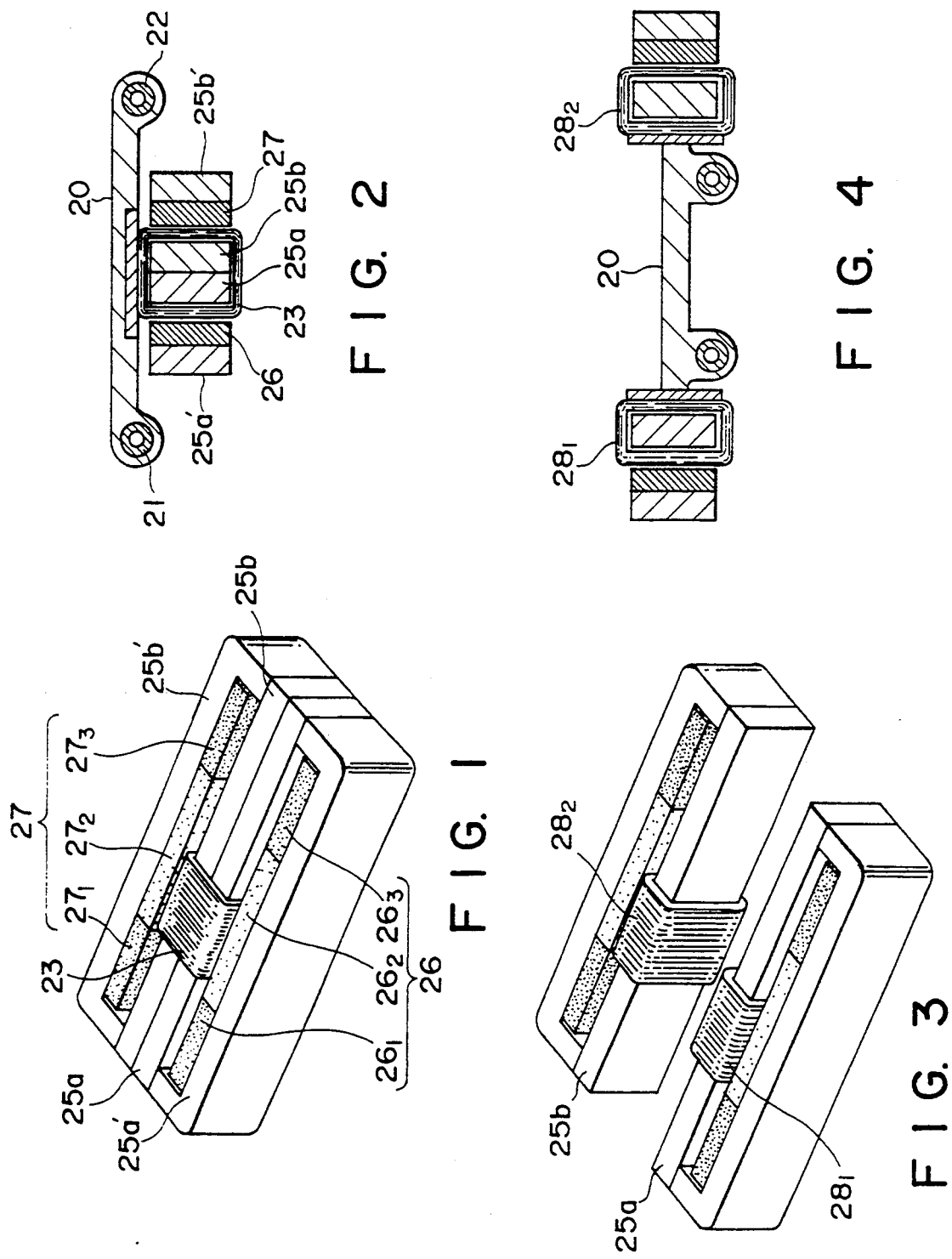

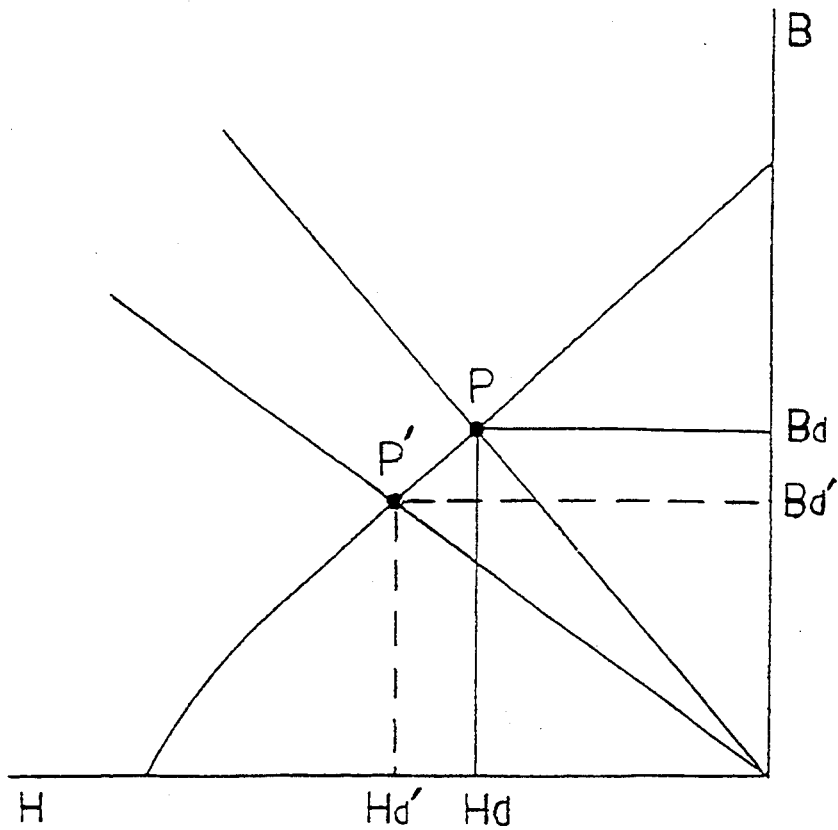
F I G. 9

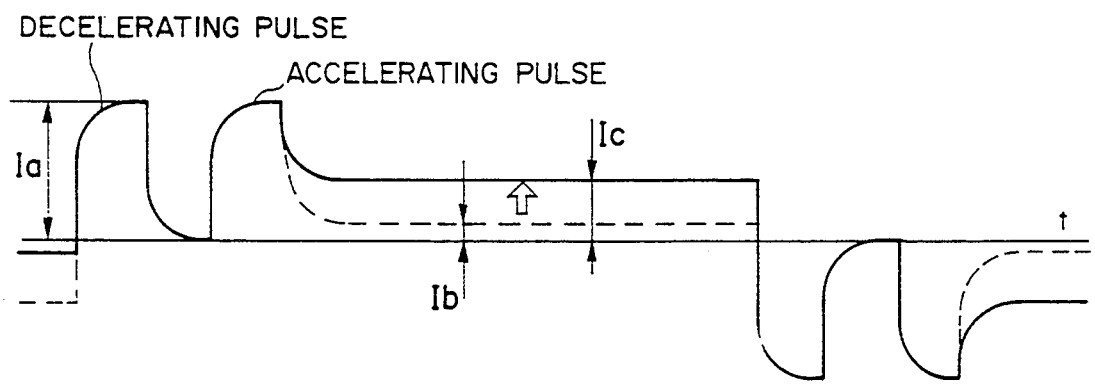
F I G. 10

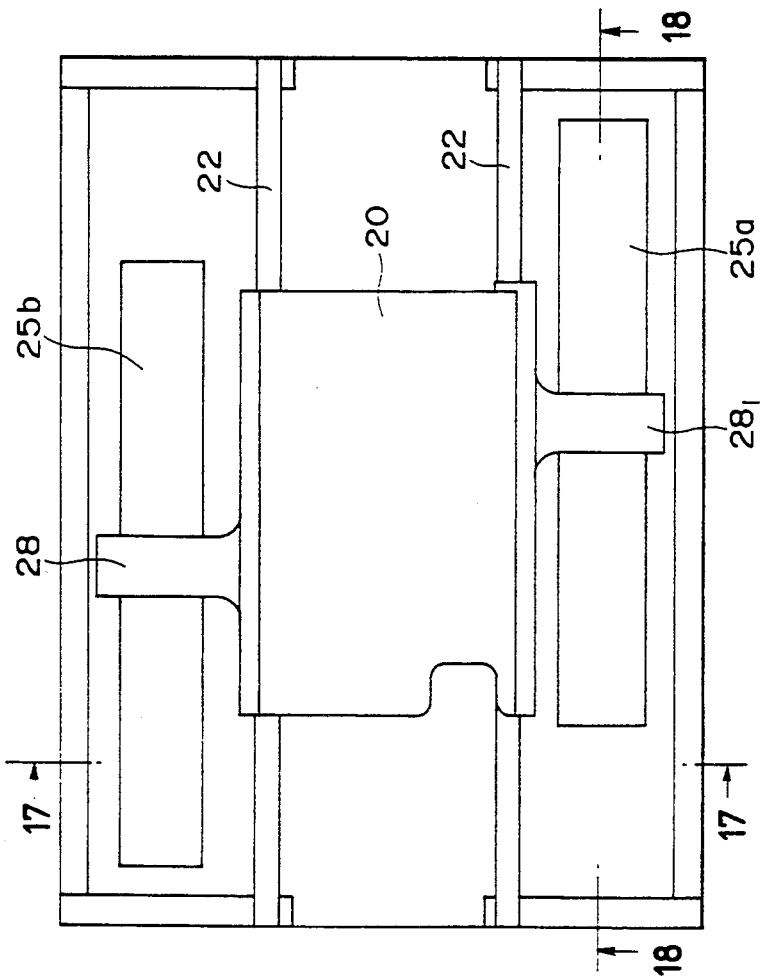
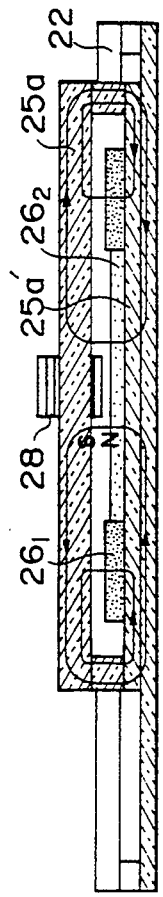
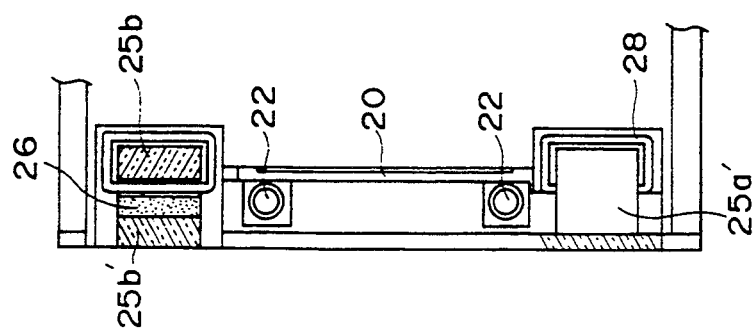
FIG. 16
FIG. 18
FIG. 17

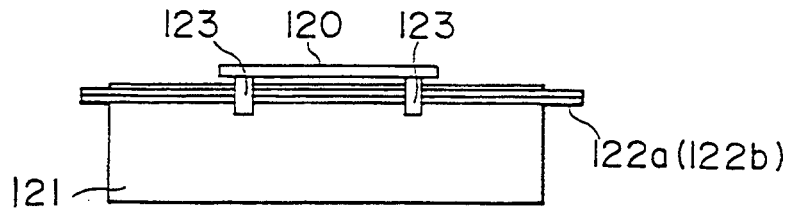
F I G. 21
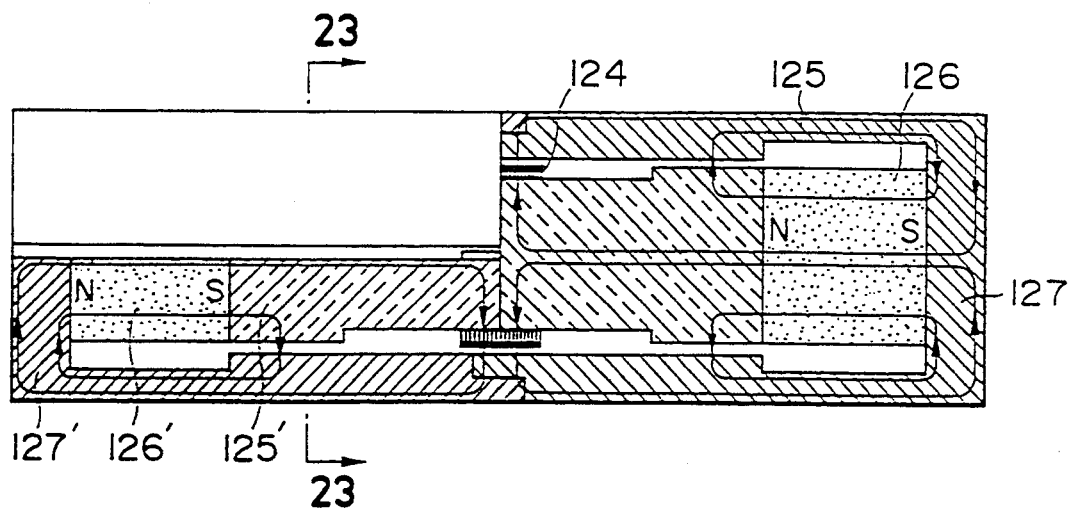
F I G. 22
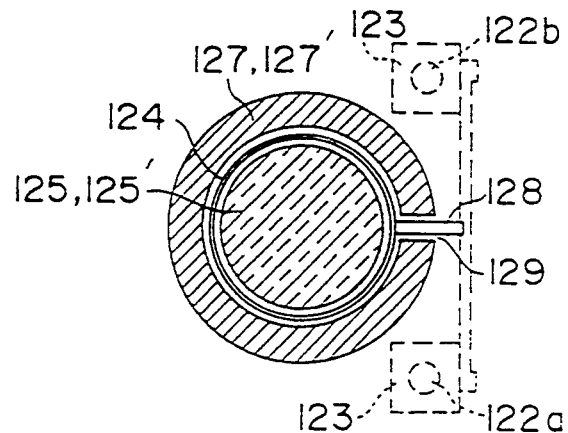
F I G. 23

LINEAR MOTOR WITH PERMANENT MAGNETS

BACKGROUND OF THE INVENTION

1. Field of the Invention

The present invention relates to a linear motor used for transporting a card such as an optical card.

2. Description of the Related Art

A linear motor has been used for transporting a card such as an optical card or driving an optical head or the like.

A linear motor is constructed of a stator and a rotor or movable member. The stator has a pair of magnetic circuits each constructed of a linear yoke and another yoke. Within the spaces defined by the two linear yokes and the other two yokes, a pair of linear magnets are mounted on the other two yokes while providing linear gaps between the magnets and the linear yokes. The rotor has a moving coil and is mounted on the linear yokes constituting the magnetic circuits. When the moving coil is powered, the rotor linearly moves along the linear yokes.

Referring to FIGS. 34 and 35 showing an example of a conventional linear motor, linear magnets 1 and 2 magnetized in the thickness direction are mounted on the inner surfaces of yokes 3 and 4 with the same poles facing each other, the yokes having both end portions being bent. Linear yokes 5 and 6 inserted into a bobbin 8 are integrally coupled to the yokes 3 and 4. The bobbin 8 has a moving coil 7 wound about it.

The moving coil 7 is mounted to a holding member 9 formed in the lower portion of a shuttle 11 which extends over the moving coil, yokes, and magnets. The shuttle 11 has bearings 12 and 13 at opposite sides thereof. Guide shafts 14 and 15 are coupled to the bearings 12 and 13.

With the linear motor constructed as above, magnetic fluxes from the N poles of the linear magnets 1 and 2 go toward the inner linear yokes 5 and 6 while traversing the moving coil 7, and return back via the linear yokes 5 and 6 to the S poles of the linear magnets 1 and 2. If a d.c. current flows through the moving coil 7, the magnetic fluxes of the linear magnets 1 and 2 link with the d.c. current to provide an electromagnetic action therebetween so that a mechanical action force is generated between the linear magnets 1 and 2 and the moving coil 7 to thereby move the latter.

A thrust force F applied to the moving coil 7 is generally given by $F = Bil$, where B is a magnetic flux density acting to the moving coil, i is a coil current, and l is an effective coil length activated by a magnetic field. In order to move the shuttle 11 (moving coil 7) in the reverse direction, the current supplied to the moving coil 7 is reversed.

In a transport apparatus for transporting a card such as an optical card by using a linear motor of the type described above, it is necessary to reciprocally move an optical card at a high speed, and to decelerate, stop, and accelerate the card within a limited distance or in a limited time.

A conventional transport apparatus is associated, however, with some problem. Namely, magnetic fluxes from the permanent magnets for generating magnetic fields in the linear gaps in the same direction are uniform, i.e., the permanent magnets each are formed with a single magnet constituting a magnetic circuit. As a result, if an acceleration speed (deceleration speed) is made faster, magnetic saturation occurs at the opposite end portions of the linear yokes 5 and 6 and other yokes 3 and 4, so that the magnetic flux density reduces at the acceleration speed (deceleration speed) area and a desired acceleration speed (deceleration speed) cannot be obtained.

Another conventional linear motor is shown in FIG. 36 wherein a single magnet is used to form a magnetic circuit. The magnetic flux density distribution gradually changes in the longitudinal direction of the motor. It is therefore necessary to flow a very large current in order to obtain a sufficient thrust force at the acceleration speed area, resulting in a large diameter of coil winding and a large weight of the driving system.

Another conventional linear motor is shown in FIG. 37 wherein yokes 3, 4, 5, and 6 constituting a magnetic circuit are designed to have a sufficiently small magnetic reluctance. Although this linear motor has a good magnetic characteristic, the thickness of a yoke becomes large, resulting in a large-sized magnetic circuit.

In a conventional optical head driving mechanism using linear motors shown in FIGS. 38 and 39, the centers of guide shafts are not flush with the plane of driving force of the linear motors serving as driving means. This is also true for the case of a card transport mechanism. In FIGS. 38 and 39, two parallel guide shafts 2' and 3' are disposed different in height at both sides of a transport stage 1' having an optical head. The guide shafts 2' and 3' are inserted into two slide bearings 4' such that the transport stage 1' can be guided along the guide shafts 2' and 3'.

Moving coil type linear motors are provided at both sides of the transport stage 1'. An elongated rectangular yoke 5' is disposed above and along the guide shaft 2'. A permanent magnet 6' magnetized in the thickness direction thereof is mounted at the yoke 5' at the position remotely from the transport stage 1'. The yoke 5' is inserted into the central hole of a coil 7' which is fixedly connected to the transport stage 1'. One of the linear motors is constituted by the yoke 5', permanent magnet 6', and coil 7'.

An encoder plate 12' mounted on the upper surface of the transport stage 1' and a sensor 13' disposed at the back of the yoke 5' constitute a linear encoder for detecting the position and speed of the transport stage 1'.

As described above, with this conventional optical head driving mechanism, the centers of the guide shafts 2' and 3' are not flush with the plane of driving force of the linear motors, a difference in height being present between them.

SUMMARY OF THE INVENTION

The present invention has been made in consideration of the above problems. It is an object of an embodiment of this invention to provide a linear motor for driving a card capable of making compact a card driving unit and obtaining appropriate acceleration/deceleration.

In order to achieve the above object of the present invention, there are provided:

a linear motor having a magnetic circuit and a moving coil, the magnetic circuit comprising a linear yoke provided at the center of the circuit and a pair of linear magnets, the linear yoke and the pair of linear magnets forming a pair of linear gaps with the linear yoke interposed therebetween, the magnetic circuit applying a magnetic field to the linear gaps, the movable coil mounted on the linear yoke of the magnetic circuit being moved along the linear yoke by an electromagnetic action to the magnetic circuit when the movable coil is powered, wherein the linear magnet has a larger magnetic force at opposite end portions in the longitudinal direction of the linear magnet than at an intermediate area;

a linear motor having a magnetic circuit and a moving coil, the magnetic circuit comprising a linear yoke and a linear magnet, the linear yoke and the linear magnet forming a linear gap with the linear yoke interposed therebetween, the magnetic circuit applying a magnetic field to the linear gap, the movable coil mounted on the linear yoke of the magnetic circuit being moved along the linear yoke by an electromagnetic action to the magnetic circuit when the movable coil is powered, wherein the linear magnet has a considerably small magnetic force at an intermediate area in the longitudinal direction of the linear magnet than at opposite end portions thereof, and the magnetic reluctance of the magnetic circuit is made large to obtain a driving current of the movable coil corresponding to the magnetic reluctance when the moving coil moves at the intermediate area of the linear magnet; and a linear motor having a magnetic circuit and a moving coil, the magnetic circuit comprising a linear yoke and a linear magnet, the linear yoke and the linear magnet forming a linear gap with the linear yoke interposed therebetween, the magnetic circuit applying a magnetic field to the linear gap, the movable coil mounted on the linear yoke of the magnetic circuit being moved along the linear yoke by an electromagnetic action to the magnetic circuit when the movable coil is powered, wherein the magnetic circuit is mounted on a plate made of material having the same magnetic reluctance as the linear yoke.

The magnetic flux density at the linear gap of the magnetic circuit constructed as above is large at opposite end portions of the linear gap and small at the intermediate area. When current flows through the moving coil, the electromagnetic action therefore becomes larger when the moving coil is at the opposite end portions than at the intermediate area, to thereby produce a larger mechanical action force at the opposite end portions. As a result, a large acceleration/deceleration force is applied to the moving coil at the opposite end portions of the linear gap, i.e., at the opposite end portions of the motion span of the moving coil.

Furthermore, the magnetic force of the linear magnet is made considerably smaller at the intermediate area in the longitudinal direction of the magnetic circuit than at the opposite end portions to limit the magnetic flux density at the opposite end portions. As a result, an operating point can be selected without magnetic saturation even with a compact magnetic circuit. Since the magnetic flux amount is reduced, a current to the moving coil is increased to prevent the thrust force from being lowered.

Since the magnetic circuit is mounted on the plate made of material having the same magnetic reluctance as that of the yoke, the plate integral with the magnetic circuit allows to pass magnetic fluxes.

According to the present invention, the magnetic force at the opposite end portions of the linear gap is made larger than at the intermediate area. Therefore, a large acceleration/deceleration force can be applied to the moving coil when it is at the opposite end portions. The time required for acceleration/deceleration becomes short, while efficiently controlling the acceleration/deceleration and preventing magnetic saturation of the yoke at the opposite end portions. Thus, a yoke can be made compact with a simple and cost effective manner.

Furthermore, the magnetic force of the linear motor is made considerably smaller at the intermediate area in the longitudinal direction of the magnetic circuit than at the opposite end portions to thereby move the operating point and increase the current supplied to the moving coil. Therefore, even a compact magnetic circuit will not generate magnetic saturation, thereby providing a compact linear motor.

Still further, the magnetic circuit is mounted on the plate made of material having the same magnetic reluctance as that of the yoke. Therefore, the magnetic circuit can be made compact by the amount corresponding to the magnetic path given by the plate.

BRIEF DESCRIPTION OF THE DRAWINGS

FIGS. 1 to 4 are perspective views and cross sectional views showing embodiments of a linear motor used with an optical card recording/reproducing apparatus according to the present invention;

FIG. 9 shows a change in the operating point of the magnetic circuit shown in FIG. 8;

FIG. 10 shows the waveform of a current flowing through the coil of the embodiment shown in FIG. 8;

FIGS. 16 to 18 are a front view, a cross section side view, and a bottom view showing another example of a card transport apparatus using the embodiment of the linear motor shown in FIG. 8;

FIG. 21 is a schematic diagram showing the card transport section of an optical recording/reproducing apparatus according to an embodiment of this invention;

FIG. 22 shows the structure of the linear motor of FIG. 21;

FIG. 23 is a cross sectional view taken along line A—A of FIG. 22;

DETAILED DESCRIPTION OF THE PREFERRED EMBODIMENTS

Figure 5:
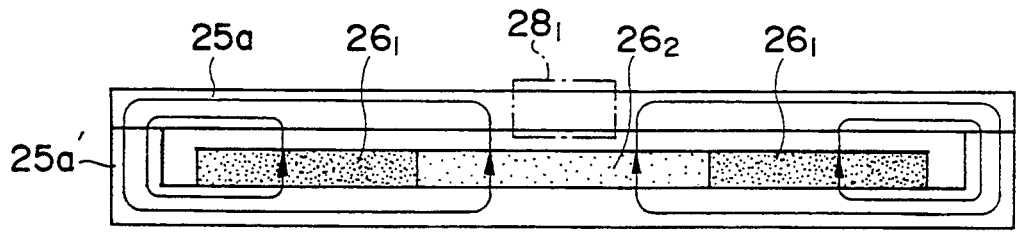
FIG. 5 is a schematic diagram illustrating the concept of a linear motor.

FIGS. 1 to 4 are perspective views and cross sectional views showing embodiments of a linear motor used with an optical card recording/reproducing apparatus according to the present invention.

In the embodiment shown in FIGS. 1 and 2, the recording/reproducing apparatus is constructed such that an optical card can be automatically mounted on and dismounted from a shuttle 20. This shuttle 20 is slidably held by two slide shafts 21 and 22 which are fixedly mounted in parallel with each other.

An optical card is pulled in within the apparatus by a card pull-in mechanism (not shown) at a card inlet side, and placed on the shuttle 20. In order to reciprocally move the shuttle 20 along the slide shafts 21 and 22, a moving coil 23 is provided movably inserted in juxtaposed linear yokes 25a and 25b.

The moving coil 23 is wound without using a bobbin by bonding coil windings together. It is apparent that a bobbin may be made to make the moving coil 23.

Other yokes 25a' and 25b' generally of a rectangular shape having an open side and opposite end portions being bent, are coupled to the linear yokes 25a and 25b, respectively, with linear gaps being interposed therebetween. The central linear areas of the other yokes 25a' and 25b' extend in parallel with the linear yokes 25a and 25b.

Permanent magnets 26 and 27 are mounted inside of the one-side opened yokes 25a' and 25b' to generate magnetic fluxes traversing the moving coil 23 and generate magnetic fields propagating within the linear gaps in the same direction. In this manner, a linear motor is completed.

When current flows through the moving coil 23, the shuttle 20 reciprocally moves along the slide shafts 21 and 22, the direction of motion being determined by the polarity of the current.

Each of the permanent magnets 26 and 27 is constructed of a combination of magnets having different magnetic forces. Namely, the permanent magnet 26 is constructed of magnets $26_1$ and $26_3$ (such as samarium cobalt magnet) at opposite ends and a magnet $26_2$ (a cheap magnet such as a ferrite magnet) at the center. The permanent magnet 27 is constructed of magnets $27_1$ and $27_3$ (such as samarium cobalt magnet) at opposite ends and a magnet $27_2$ (a cheap magnet such as a ferrite magnet) at the center. The magnets at the opposite ends have a larger energy product than that of the center magnet.

A light shielding plate (not shown) is mounted below the shuttle 20 for detecting the position of the shuttle 20 by shielding or exposing light. There is also provided a scale (not shown) printed with a clock pattern, the scale being disposed along the direction of movement of the shuttle 20 and detected with a linear encoder sensor to generate an encoder pulse.

The shuttle 20 is accelerated, decelerated, or stopped at the opposite end portions of the linear gaps, during the reciprocal motion of the shuttle 20 by the linear motor. A strong magnetic force is required at the acceleration/deceleration speed area, whereas not so strong magnetic force is required at a constant speed area intermediate between the opposite end portions. For example, if an acceleration speed is raised using a single magnet constituting a magnetic circuit, the magnetic force becomes too strong at the constant speed area. As a result, in order to avoid magnetic saturation at the opposite end portions of the linear yokes and other yokes, an outer dimension of the linear motor becomes correspondingly large and the cost becomes high. In other words, if a single permanent magnet (ferrite) having a weak magnetic force and constituting a magnetic circuit is used, the area of the magnet and the dimension of the yokes become large in order to increase the magnetic force for dealing with a necessary acceleration/deceleration speed, and the cost becomes high correspondingly.

On the contrary, according to the present invention, the magnets $26_1$ and $26_3$ of the permanent magnet 26 are constructed of magnets having a stronger magnetic force such as samarium cobalt magnets than that of the ferrite magnet $26_2$ at the center at the constant speed area. Accordingly, a stronger thrust force (anti-thrust force) can be obtained for acceleration (deceleration) at the opposite end portions, while making the outer dimension of the yokes smaller than conventional. With the above arrangement, it is therefore possible to efficiently obtain a necessary thrust force.

In the above embodiment, the ferrite magnet $26_2$ at the center have the same thickness as that of the permanent magnets $26_1$ and $26_3$ at the opposite ends. The thickness of the magnet $26_2$ may be made smaller than that of the opposite end magnets $26_1$ and $26_3$ so that the magnetic flux density at the gap of the central magnet $26_2$ can be adjusted.

FIGS. 3 and 4 show another embodiment of the linear motor used with a recording/reproducing apparatus. In FIGS. 3 and 4, like elements to those shown in FIG. 1 are represented by using identical reference numerals. In contrast with the linear motor shown in FIGS. 1 and 2 having one moving coil movable along the central linear yokes, moving coils $28_1$ and $28_2$ are used to obtain a thrust force, the moving coil $28_1$ being provided for the combination of a linear yoke 25a, another yoke 25a' and a permanent magnet 26, and the moving coil $28_2$ being provided for the combination of a linear yoke 25b, another yoke 25b', and a permanent magnet 27. The moving coils $28_1$ and $28_2$ are disposed at opposite sides of a shuttle 20 and are movable along the linear yokes 25a and 25b inserted into the coils.

FIG. 5 is a schematic diagram illustrating the concept of a linear motor. In FIG. 5, a yoke assembly is composed of a yoke 25a' and a linear yoke 25a extending in parallel with a gap interposed therebetween. A permanent magnet 26 is mounted at the side of the yoke 25a' for the generation of magnetic fluxes traversing a coil $28_1$. The permanent magnet 26 is constructed of magnets $26_1$ and $26_3$ at opposite ends having a large energy product such as a samarium cobalt magnet, and a magnet $26_2$ at the center having a small energy product such as a ferrite magnet. These magnets are bonded together with adhesive agent to form the integral permanent magnet 26.

Figure 6:
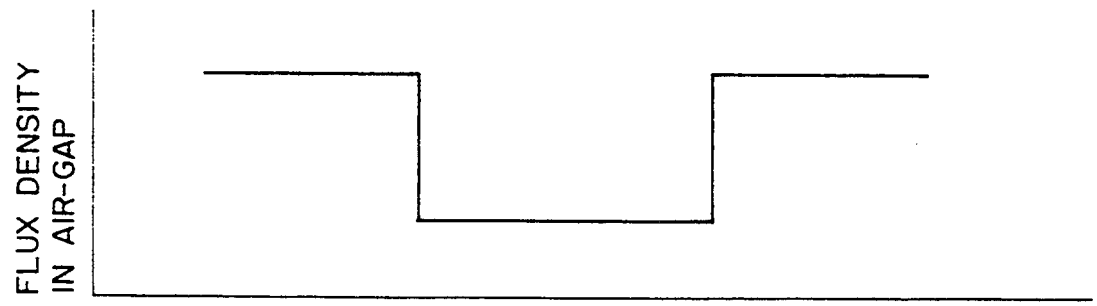
FIG. 6 shows a magnetic flux density at the gap between the permanent magnet and the linear yoke.

FIG. 6 shows a magnetic flux density at the gap between the permanent magnet and the linear yoke. The magnetic flux density at the opposite end portions is for example about 4000 Gausses, and that at the constant speed area is equal to or one half 4000 Gausses.

Figure 7:
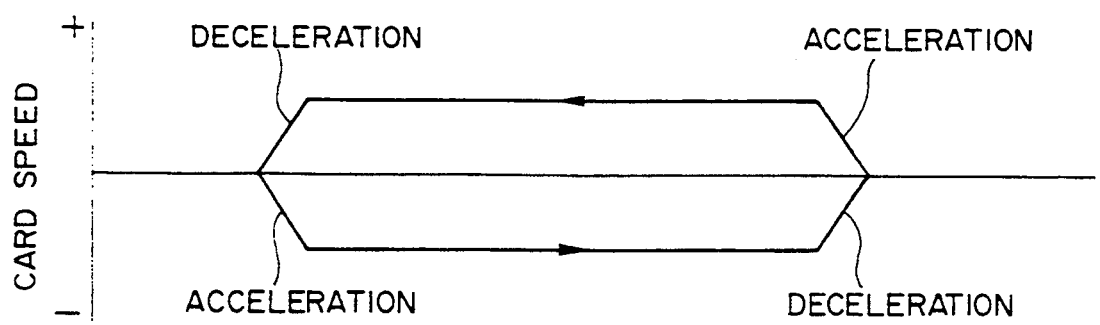
FIG. 7 is a graph showing a card speed relative to a card position represented by the abscissa.

FIG. 7 is a graph showing a card speed relative to a card position represented by the abscissa. As seen from the acceleration/deceleration characteristics of FIG. 7, rapid acceleration and deceleration can be achieved in a short time period.

Figure 8:
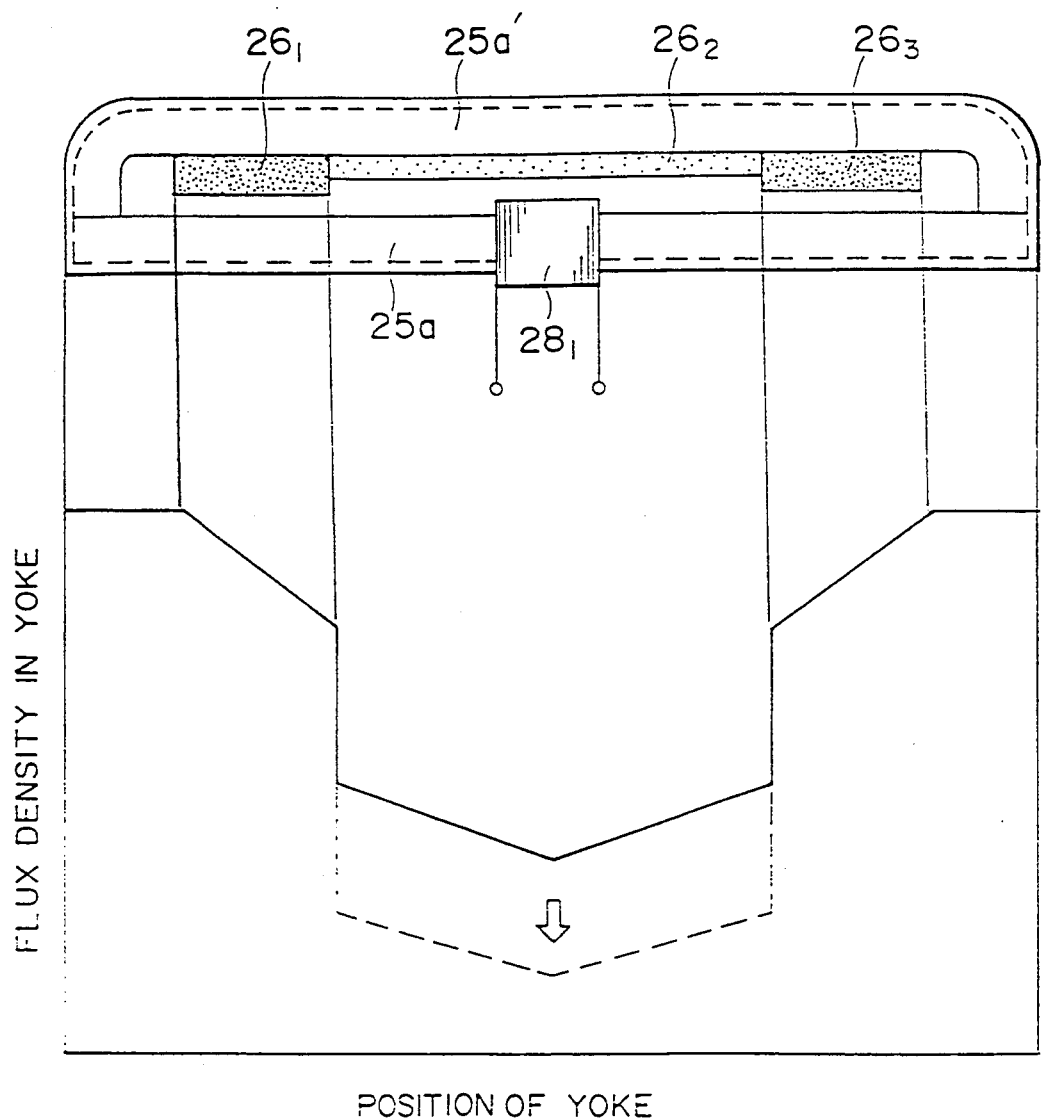
FIG. 8 shows the magnetic circuit arrangement and its magnetic flux distribution according to another embodiment of this invention.

FIG. 8 shows the magnetic circuit arrangement and its magnetic flux distribution according to another embodiment of this invention. In FIG. 8, a yoke assembly is composed of a yoke 25a' and a linear yoke 25a extending in parallel with a gap interposed therebetween. A permanent magnet 26 is mounted at the side of the yoke 25a' for the generation of magnetic fluxes traversing a coil $28_1$. The permanent magnet 26 is constructed of magnets $26_1$ and $26_3$ at opposite ends having a large energy product such as a samarium cobalt magnet, and a magnet $26_2$ at the center having a considerably small energy product such as a ferrite magnet. These magnets are bonded together with adhesive agent to form the integral permanent magnet 26. With this arrangement, the operating point of the magnetic circuit changes.

FIG. 9 shows a change of the operating point of the magnetic circuit shown in FIG. 8. An operating point (P) at the magnetic flux density Bd and coercive force Hd changes to an operating point (P') at the magnetic flux density Bd'.

FIG. 10 shows the waveform of a current flowing through the coil of the embodiment shown in FIG. 8. Before and after a change of the operating point, the acceleration pulse and deceleration pulse having a maximum value Is do not change at the acceleration/deceleration area, but the current at the constant speed area increases from Ib indicated by a broken line to Ic indicated by a solid line.

Figure 11:
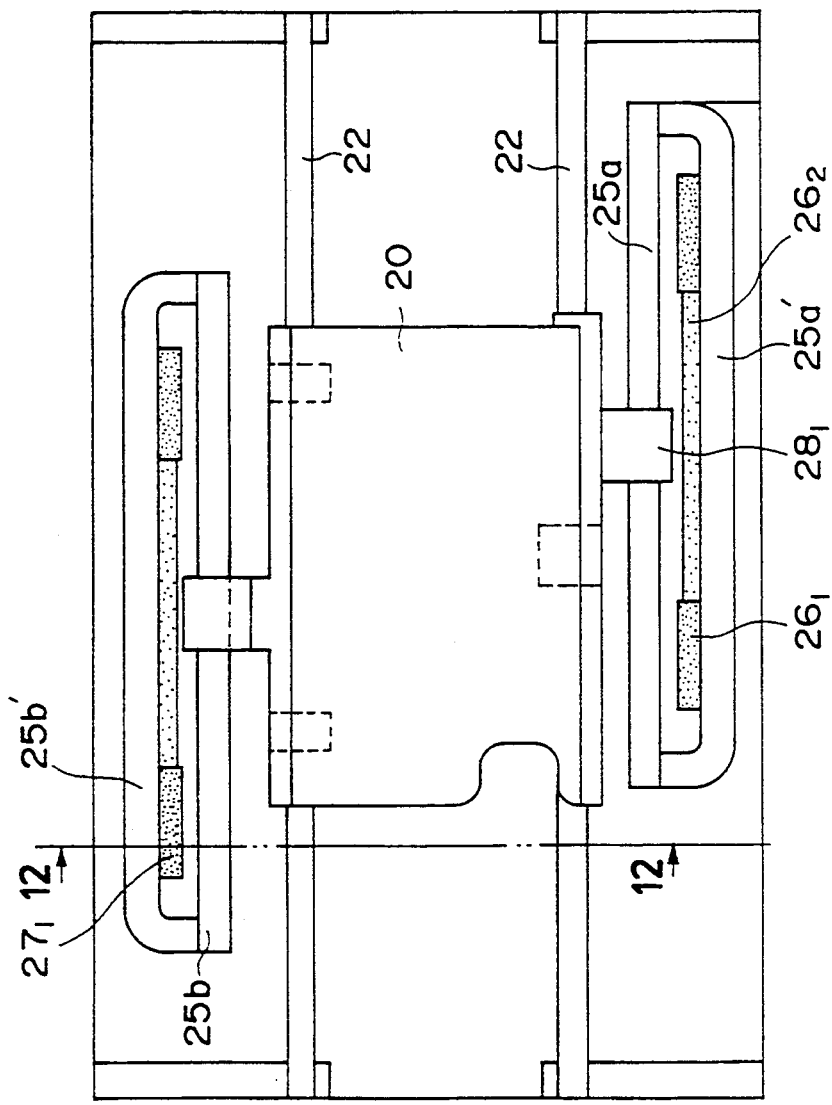
FIGS. 11 and 12 are a plan view and a cross sectional side view showing an example of a card transport apparatus using the embodiment of the linear motor shown in FIG. 8.
Figure 12:
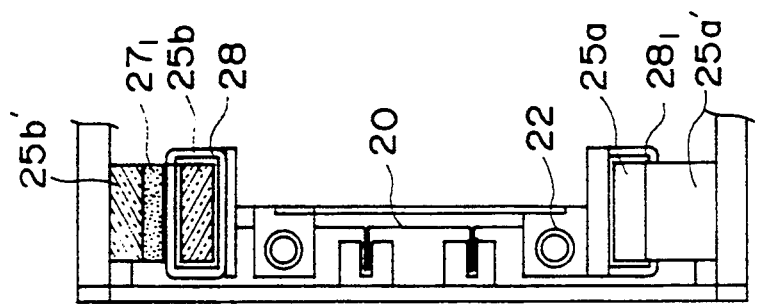

FIGS. 11 and 12 are a plan view and a cross sectional side view showing an example of a card transport apparatus using the embodiment of the linear motor shown in FIG. 8. Linear motors of the embodiment shown in FIG. 8 are mounted at opposite sides of a card transport stage 20 to move the stage 20 along guide shafts 22.

Figure 13:
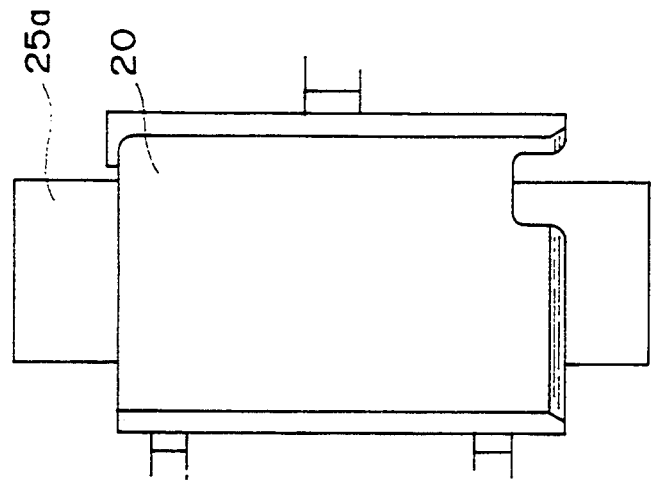
FIGS. 13 to 15 are a plan view, a side view, and a bottom view showing another example of a card transport apparatus using the embodiment of the linear motor shown in FIG. 8.
Figure 15:
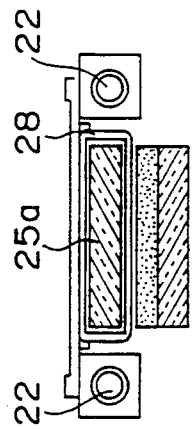
Figure 14:
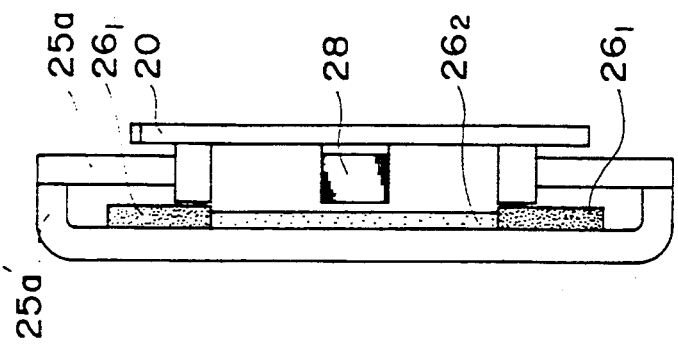

FIGS. 13 to 15 are a plan view, a side view, and a bottom view showing another example of a card transport apparatus using the embodiment of the linear motor shown in FIG. 8. A linear motor of the embodiment shown in FIG. 8 is mounted on the bottom of a card transport stage 20 which moves in the longitudinal direction of the yoke 25a, i.e., upward and downward as viewed in FIGS. 13 and 14.

FIGS. 16 to 18 are a front view, a cross sectional side view, and a bottom view showing another example of a card transport apparatus using the embodiment of the linear motor shown in FIG. 8. In this case, a magnetic circuit is mounted on a plate having a small magnetic reluctance so that it can be made compact.

Figure 19:
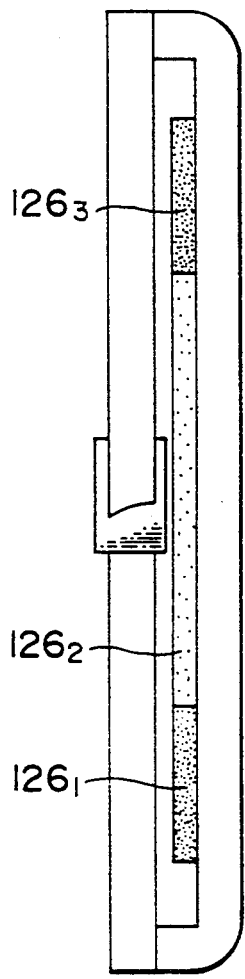
FIGS. 19 and 20 show a magnetic circuit composed of linear magnets $126_1$ and $126_3$ having a magnetic characteristic different from a magnet $126_2$.
Figure 20:

FIGS. 19 and 20 show a magnetic circuit composed of linear magnets $126_1$ and $126_3$ having a magnetic characteristic different from a magnet $126_2$. The magnets $126_1$, $126_2$, and $126_3$ have the same thickness so that the magnetic circuit can be formed compact or thin.

FIG. 21 is a schematic diagram showing the card transport section of an optical recording/reproducing apparatus according to an embodiment of this invention. In this embodiment, a shuttle 120 slides along slide shafts by the operation of a magnetic circuit 121 constituting a linear motor.

FIG. 22 shows the structure of the linear motor of FIG. 21, and FIG. 23 is a cross sectional view taken along line A—A of FIG. 22.

The optical card recording/reproducing apparatus of this embodiment is constructed such that an optical card can be automatically mounted on and dismounted from the shuttle 120. This shuttle 120 is slidably held by a pair of slide shafts 122a and 122b which are mounted at opposite sides of the linear motor in parallel with each other. Guide units 123 are provided under the shuttle 120 for coupling the shuttle 120 to the linear motor.

An optical card is pulled in within the apparatus by a card pull-in mechanism (not shown) at a card inlet side, and placed on the shuttle 120. In order to reciprocally move the shuttle 20 along the slide shafts 122a and 122b, there is provided within the magnetic circuit (linear motor) portion a moving coil 124 which is inserted into inner yokes 125 and 125' and movable along the longitudinal direction of the yokes.

The moving coil 124 is wound without using a bobbin by bonding coil windings together. It is apparent that a bobbin may be made to make the moving coil 124. The N poles of permanent magnets 126 and 126' are bonded to the opposite ends of the inner yokes 125 and 125', the permanent magnets generating magnetic fluxes traversing the moving coil 124. The S poles of the permanent magnets 126 and 126' are bonded to outer yokes 127 and 127'. In this manner, an inner-magnet type linear motor is completed.

In this embodiment, the inner yokes 125 and 125', outer yokes 127 and 127', and permanent magnets 126 and 126' are formed in a circular tube shape. The shape is not limited to this, but a rectangular tube shape may also be used.

The magnetic circuit (linear motor) 121 is mounted at the center of a shuttle driver unit to reciprocally move the shuttle 120. When current flows through the moving coil 124, the shuttle 120 reciprocally moves along the slide shafts 122a and 122b, the direction of motion being determined by the polarity of the current.

As shown in FIG. 23, there is provided a transport shaft 128 for fixing the moving coil of the linear motor to the bottom of the shuttle 120, the shaft 128 being allowed to move along a recess 129 within the motion span of the shuttle 120. The permanent magnets 126 and 126' are constructed of rare earth metal magnets such as samarium cobalt magnets having a stronger magnetic force than a ferrite magnet, so that the magnetic field can propagate to the central area of the inner yokes.

A light shielding plate (not shown) is mounted below the shuttle 120 for detecting the position of the shuttle 120 by shielding or exposing light. There is also provided a scale (not shown) printed with a clock pattern, the scale being disposed along the direction of movement of the shuttle 120 and detected with a linear encoder sensor to generate an encoder pulse.

the shuttle 120 is accelerated, decelerated, or stopped at the opposite end portions of the linear gaps, during the reciprocal motion of the shuttle 120 by the linear motor. A strong magnetic force is required at the acceleration/deceleration speed area, whereas not so strong magnetic force is required at a constant speed area intermediate between the opposite end portions. For example, if an acceleration speed is raised using a single magnet constituting a magnetic circuit, the magnetic force becomes too strong at the constant speed area. As a result, in order to avoid magnetic saturation at the opposite end portions of the linear yokes and other yokes, an outer dimension of the linear motor becomes correspondingly large and the cost becomes high. In other words, if a single permanent magnet (ferrite) having a weak magnetic force and constituting a magnetic circuit is used, the area of the magnet and the dimension of the yokes become large in order to increase the magnetic force for dealing with a necessary acceleration/deceleration speed, and the cost becomes high correspondingly.

On the contrary, according to the present invention, the magnets such as samarium cobalt magnets having a stronger magnetic force than a ferrite magnet are disposed within the linear motor at opposite end portions thereof. Accordingly, a stronger thrust force (antithrust force) can be obtained for acceleration (deceleration) at the opposite end portions, and a weaker magnetic field is applied to the central constant speed area, while making the outer dimension of the yokes smaller than conventional. With the above arrangement, it is therefore possible to make a linear motor of low cost and efficiently obtain a necessary thrust force.

In this embodiment, as seen from FIG. 23, the discrete outer yokes 127 and 127' are joined together, and the discrete inner yokes 125 and 125' are joined together, to thereby complete the linear motor.

Figure 24A:
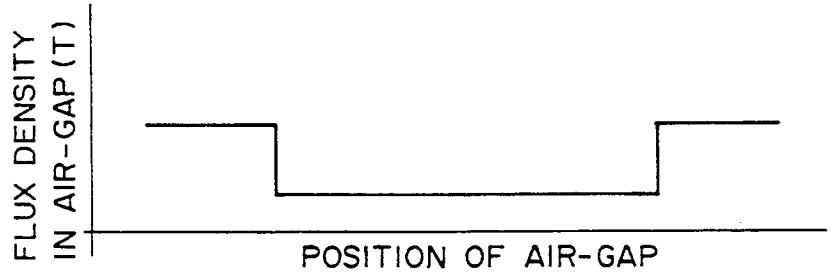
FIG. 24a—24d shows the operation characteristics of the linear motor shown in FIG. 21.

FIG. 24(a) shows the distribution of the magnetic gap length between the outer and inner yokes. The magnetic gap length is short at opposite end portions of the linear motor in the longitudinal direction, and long at the intermediate area.

Figure 24B:
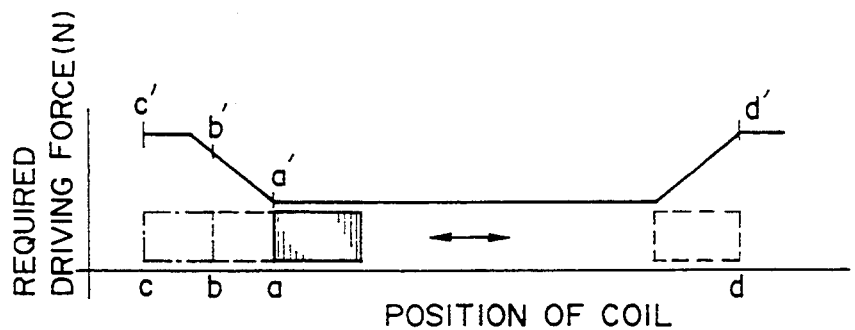

FIG. 24(b) shows a necessary driving force relative to the coil position. A large driving force becomes necessary at opposite end portions of the linear motor in the longitudinal direction.

Figure 24C:
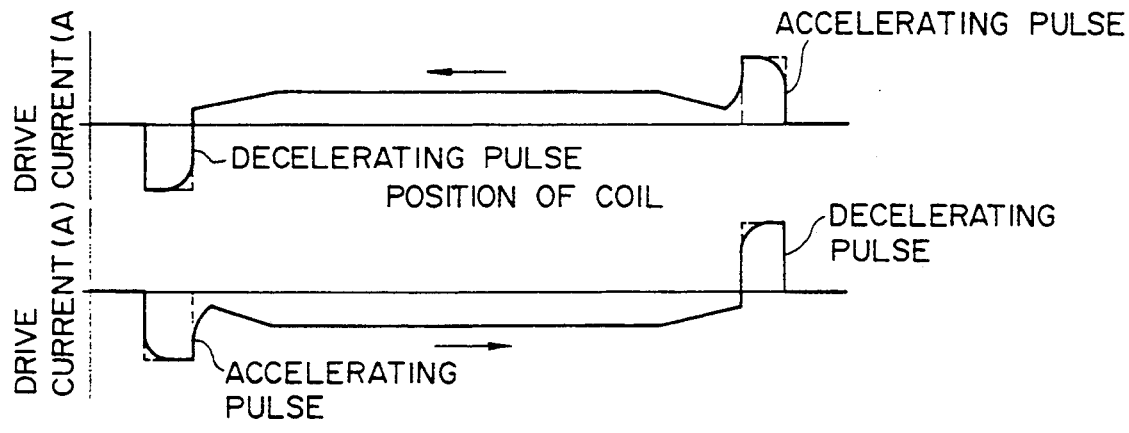

FIG. 24(c) shows a necessary driving current for the driving force shown in FIG. 24(b) relative to the coil position. For the motion to the left indicated by the left-direction arrow, a positive acceleration pulse is applied at the right end and a negative deceleration pulse at the left end, whereas for the motion to the right indicated by the right-direction arrow, a negative acceleration pulse is applied at the left end and a positive deceleration pulse at the right end.

Figure 24D:
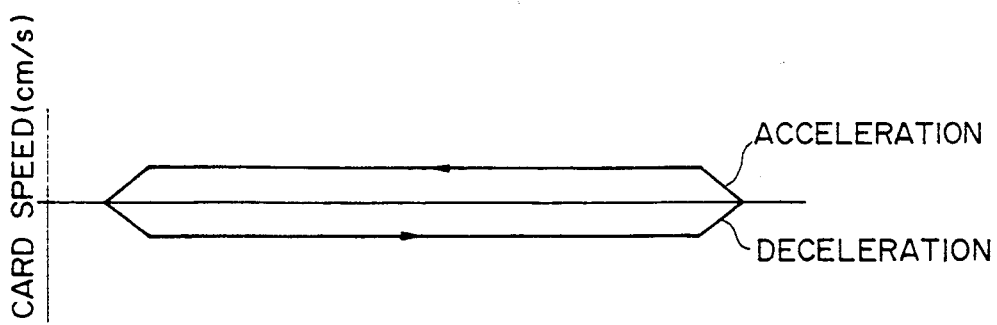

FIG. 24(d) shows a card speed relative to the coil position. The acceleration/deceleration area is at opposite end portions of the linear motor, and the constant speed area is at the intermediate section.

Figure 25:
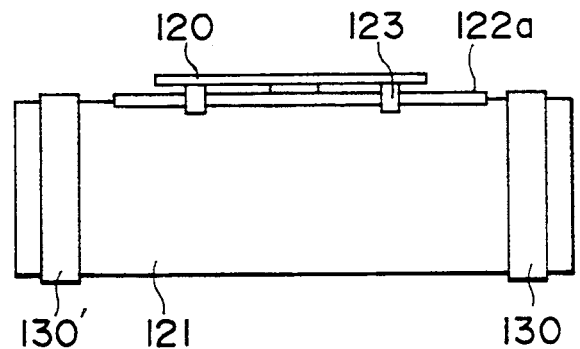
FIGS. 25 to 27 show another embodiment of a linear motor.
Figure 26:
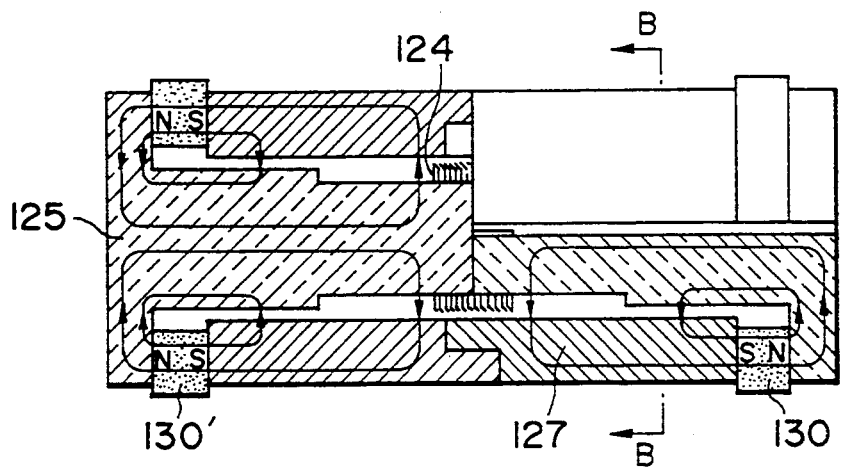
Figure 27:
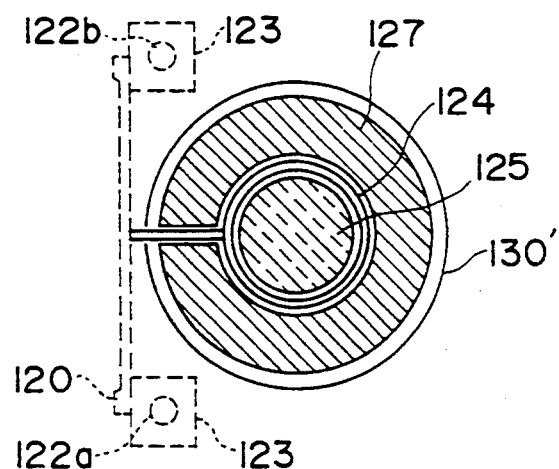

FIGS. 25 to 27 show another embodiment of a linear motor. The operation and effect of this embodiment are the same as those of the above-described inner-magnet type linear motor, so the outline thereof is omitted and only the difference therebetween will be described. The difference is that permanent magnets 130 and 130' are mounted on outer yokes at opposite end portions to form an outer-magnet type linear motor.

Figure 28:
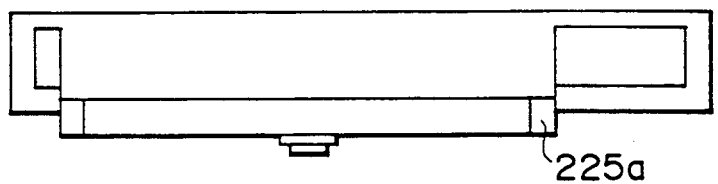
FIGS. 28 to 31 show an embodiment of a card transport unit according to the present invention.
Figure 29:
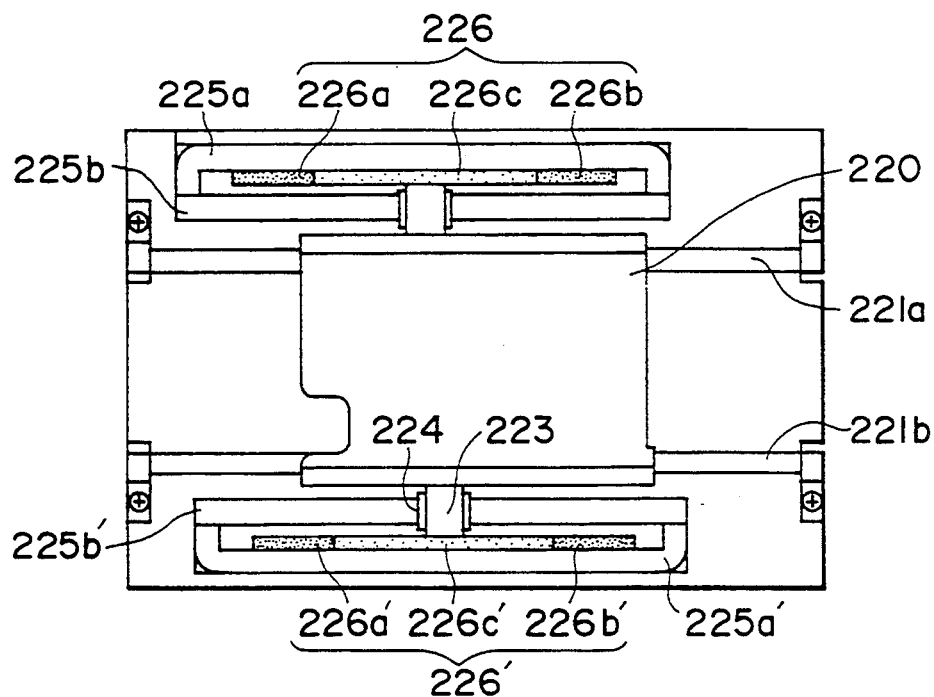
Figure 30:
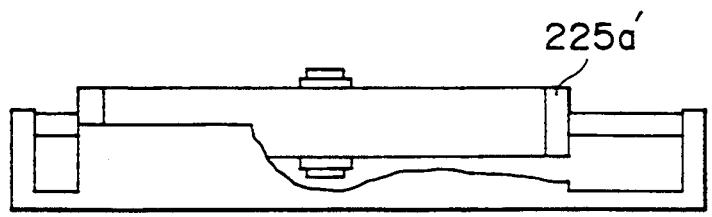
Figure 31:
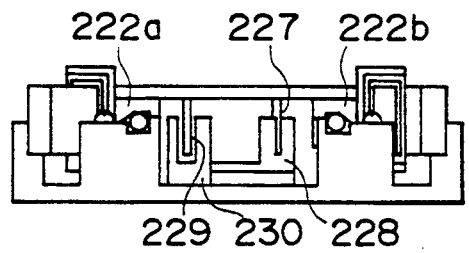

FIGS. 28 to 31 show an embodiment of a card transport unit according to the present invention. FIG. 28 is a side view of the unit, FIG. 29 is a plan view of the unit, and FIG. 30 is a side view partially broken.

In this embodiment, an optical card information recording/reproducing apparatus is constructed such that an optical card can be automatically mounted on and dismounted from a card transport stage 220 (hereinafter called a shuttle). This shuttle 220 has slide bearings 222a and 222b formed at the bottom of the shuttle 220, and is slidably held by two guide shafts 221a and 221b which are fixedly mounted in parallel with each other at substantially the central area of the shuttle transport unit C. The guide shafts 221a and 221b are inserted into the slide bearings 222a and 222b so that the shuttle 220 is guided along the guide shafts 221a and 221b. the guide shafts 221a and 221b are pushed and fixed in position by plate springs at opposite ends of the shafts.

An optical card is pulled in within the apparatus by a card pull-in mechanism (not shown) at a card inlet side, and placed on the shuttle 220. In order to reciprocally move the shuttle 220 along the guide shafts 221a and 221b, moving coils 223 wound about bobbins 224 are fixedly mounted at opposite sides of the shuttle 220. Inner driving yokes 225b and 225b' are inserted within the bobbins 224.

In this embodiment, the moving coils 223 are wound on the bobbins 224. However, the moving coil may be made without using a bobbin by bonding coil windings together.

Other yokes 225a and 225a' generally of a rectangular shape having an open side and opposite end portions being bent, are coupled to the inner yokes 225b and 225b'. Permanent magnets are mounted on the inside of the other yokes, the magnets having a magnetic force sufficiently large for generating magnetic fluxes traversing the moving coils 223. In this manner, the linear motor is completed. Two linear motors are provided at opposite sides of the shuttle transport unit to thereby reciprocally move the shuttle 220. When current flows through the moving coils 223, the shuttle 220 reciprocally moves along the guide shafts 221a and 221b, the direction of motion being determined by the polarity of the current.

Each of the permanent magnets 226 is constructed of a combination of two types of magnets having different magnetic forces. Namely, the permanent magnet 226 is constructed of magnets 226a and 226b having a large energy product of magnetic force such as samarium cobalt magnet at opposite ends and a magnet 226c having a smaller energy product of magnetic force than that of the magnets 226a and 226b such as a ferrite magnet at the center.

A light shielding plate 227 is mounted below the shuttle 220 for detecting the position of the shuttle 220 by interrupting or not interrupting light from an interrupter 228. There is also provided a scale 229 printed with a clock pattern, the scale being disposed below the shuttle 220 along the direction of movement of the shuttle 220 and detected with a linear encoder sensor 230 to generate an encoder pulse.

The card transport unit is constructed such that the plane of the driving force of the linear motor operating as driving means for the card transport stage 220 (shuttle) is made flush with the centers of the guide shafts 221a and 221b. The plane and centers are aligned in line as a reference shown in FIG. 31.

The shuttle 220 using the linear motor is accelerated, decelerated, or stopped at the opposite end portions of the linear gaps, during the reciprocal motion of the shuttle 220 by the linear motor. Conventionally, the plane of driving force of the linear motor is not flush with the centers of the guide shafts at the acceleration/deceleration speed area. As a result, upon application of a rapid acceleration/deceleration force during the reciprocal motion, abnormal vibrations and noises are likely to occur. In addition, frictional resistance between the guide shafts and slide bearings becomes large, adversely effecting information recording/reproducing.

Since the plane of driving force is made flush with the centers of the guide shafts, such disadvantages can be eliminated to suppress the adverse effects by the card transport unit.

Figure 32:
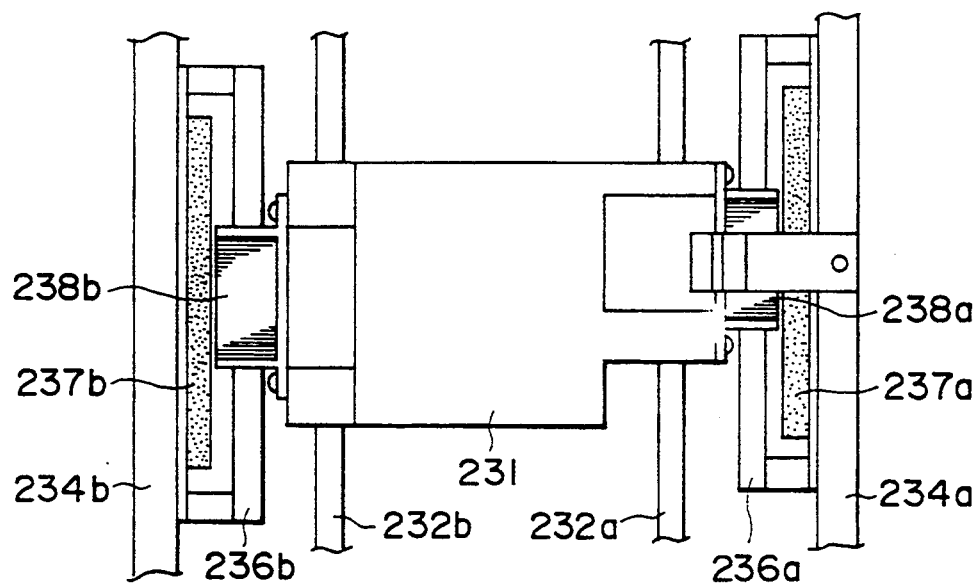
FIGS. 32 and 33 show another embodiment of an optical head transport unit.
Figure 33:
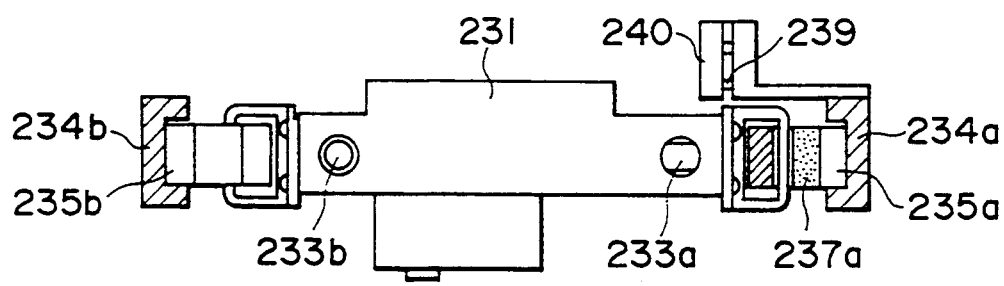
Figure 34:
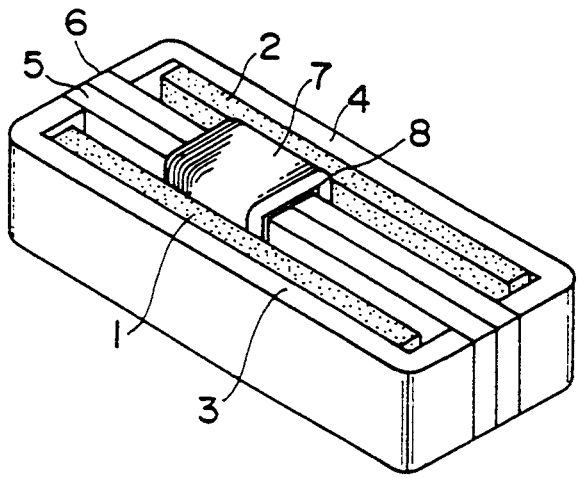
FIGS. 34 and 35 show an example of a conventional linear motor.
Figure 35:
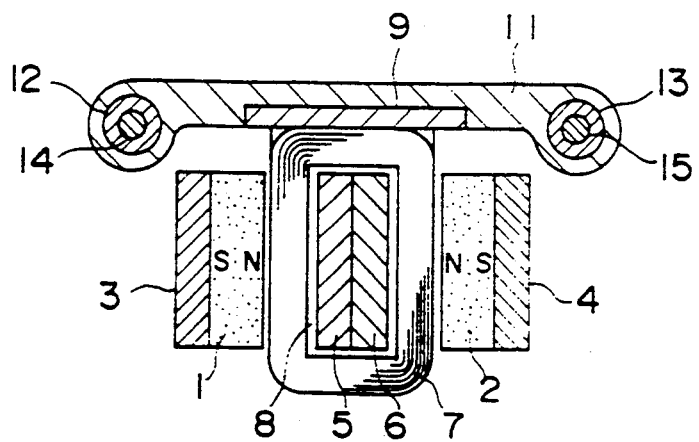
Figure 36:
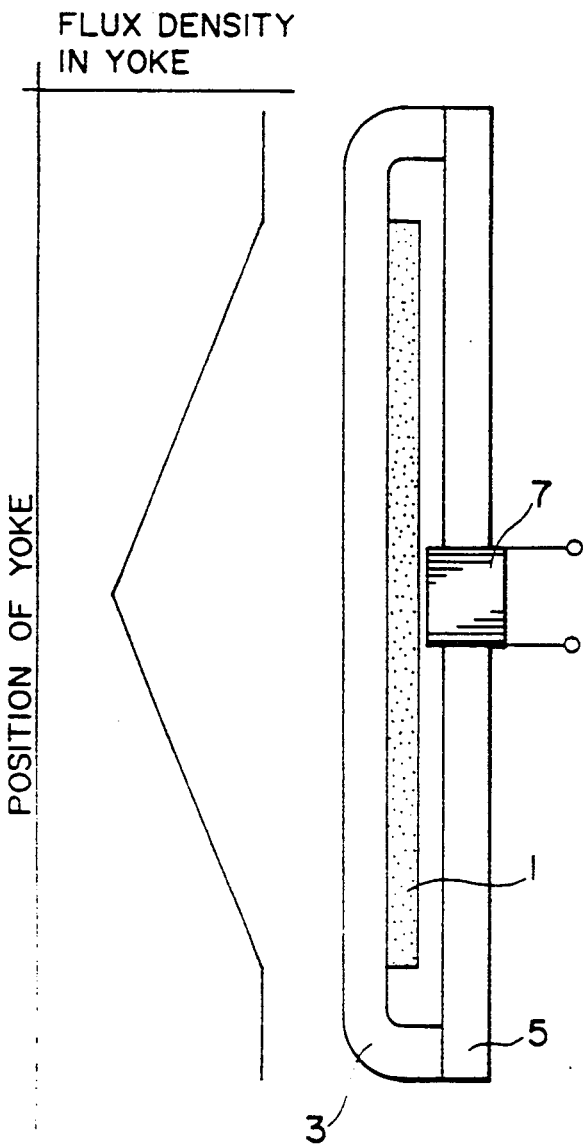
FIG. 36 shows an example of another conventional linear motor.
Figure 37:
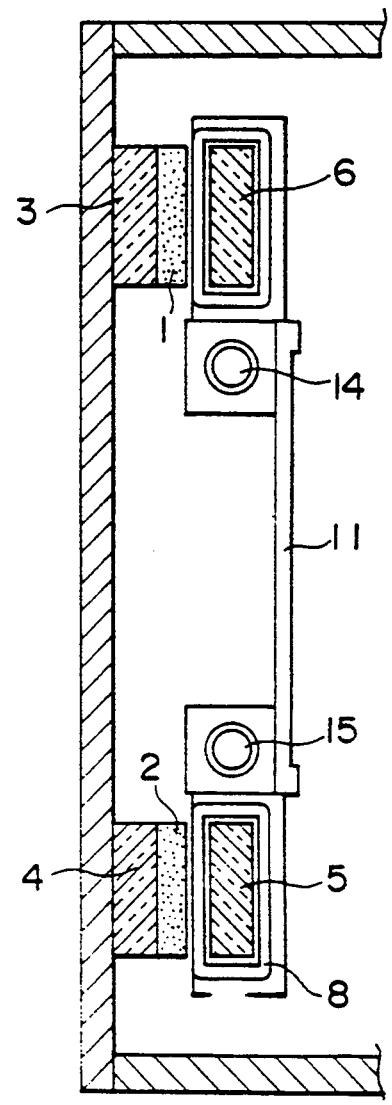
FIG. 37 shows an example of a still further conventional linear motor.
Figure 38:
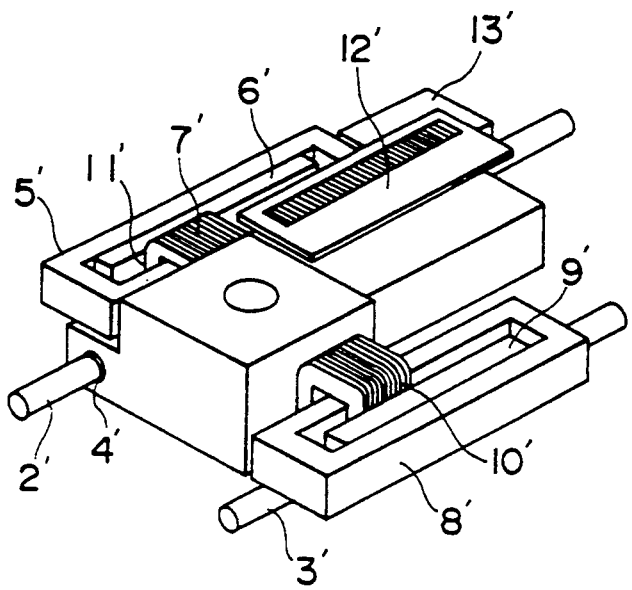
FIGS. 38 and 39 show an example of a conventional optical head driving mechanism using linear motors.
Figure 39:
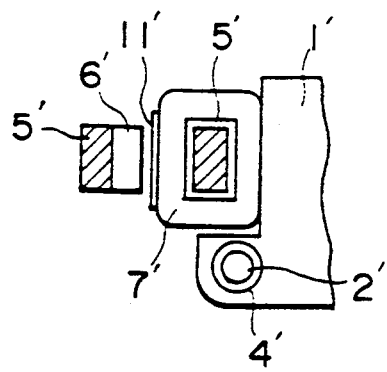

FIGS. 32 and 33 are a plan view and a side view showing another embodiment of an optical head transport unit. The optical head transport unit reciprocally moves the optical head transport stage from which a laser beam is radiated, and uses linear motors as a driving means.

The optical head transport stage 231 has an optical head for radiating a laser beam. Two parallel guide shafts 232a and 23wb are mounted at opposite sides of the optical head transport stage 231. The two guide shafts 232a and 232b are received by two slide bearings 233a and 233b mounted at opposite sides of the optical head transport stage 231, so that the transport stage 231 can be guided by the guide shafts 232a and 232b.

Moving coil type linear motors are provided at opposite sides of the optical head transport stage 231 to thereby move the optical head stage 231 up and down as viewed in the plan view of FIG. 32.

On one sides of the guide shafts, yokes 235a and 235b generally of a rectangular shape having an open side are mounted on support plates 234a and 234b, and joined to inner yokes 236a and 236b. Permanent magnets 237a and 237b magnetized in its thickness direction are mounted inside of the outer yokes 235a and 235b. The inner yokes 236a and 236b are inserted into moving coils 238a and 238b connected to the opposite sides of the optical head transport stage 231.

On one side of the optical head transport stage 231, there is provided an encoder scale 239 for detecting the position and speed of the transport stage. The encoder scale 239 is read by an encoder sensor 240 fixedly mounted on the support plate 234a.

When current flows through the moving coils 238a and 238b, the optical head transport stage 231 moves forward and backward. The centers of the guide shafts 232a and 232b are made flush with the plane of driving force by the moving coils 238a and 238b constituting the linear motor driving unit.

Similar to the above-described card transport unit, even if rapid acceleration/deceleration is applied to the transport stage during the reciprocal motion, it is possible to realize an optical head transport unit in which abnormal vibrations and noises will not occur and frictional resistance is small.

What is claimed is:

1. A linear motor having a magnetic circuit and a moving coil, the magnetic circuit comprising a linear yoke provided at a center of the magnetic circuit and a pair of linear magnets, the linear yoke and the pair of linear magnets forming a pair of linear gaps with the linear yoke interposed therebetween, the magnetic circuit applying a magnetic field to the linear gaps, the movable coil mounted on the linear yoke of the magnetic circuit being moved along the linear yoke by an electromagnetic action of the magnetic circuit when the movable coil is powered, wherein
the pair of linear magnets have a larger magnetic force at opposite end portions in a longitudinal direction than at an intermediate area and are comprised of a plurality of magnets having a first energy product at opposite end portions in the longitudinal direction of the plurality of magnets and a magnet having a second energy product at an intermediate area, the first energy product being larger than the second energy product by employing a thinner magnet at the intermediate area than those at the opposite end portions, and the pair of magnetic gaps having a first gap length at opposite end portions of a path of movement of the moving coil and a second gap length at an intermediate area, the first gap length being smaller than the second gap length.

2. A linear motor according to claim 1, wherein each of said linear magnets includes a ferrite magnet.

3. A linear motor comprising:
a pair of elongated outer and inner yokes disposed concentrically, a magnetic gap being formed between said outer and inner yokes;
a permanent magnet mounted on at least one end portion of at least one of the outer and inner yokes for applying a magnetic field to said magnetic gap; and
a moving coil surrounding the inner yoke and movable within the magnetic gap in the longitudinal direction of the inner yoke, the moving coil providing an electromagnetic action to the magnetic field generated by the permanent magnet when the moving coil is powered, wherein the magnetic gap is concentrical relative to the yokes, and the magnetic gap has a first gap length at opposite end portions of a path of movement of the moving coil and a second gap length at an intermediate area, the first gap length being shorter than the second gap length.

4. A linear motor according to claim 3, wherein the permanent magnet includes a ferrite magnet.

5. A linear motor according to claim 3, wherein the moving coil includes a transport shaft protruding adjacent to the outer yoke.

6. A linear motor according to claim 1, wherein each of the pair of linear magnets is comprised of a plurality of magnets extending along a length of the linear magnet and magnetized in a generally common direction along the length of the linear magnet.

7. A linear motor according to claim 6, wherein the general common direction is generally perpendicular to the longitudinal direction of the linear magnet.

8. A linear motor according to claim 3, wherein the permanent magnet has a direction of elongation along a length thereof and is magnetized in a direction substantially perpendicular to the direction of elongation thereof along the length thereof.

* * * * *